(12) United States Patent
    Free

(10) Patent No.: US 9,076,029 B2
(45) Date of Patent: Jul. 7, 2015

(54) LOW THRESHOLD FACE RECOGNITION

(71) Applicant: Apple Inc., Cupertino, CA (US)

(72) Inventor: Robert Mikio Free, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 13/692,500

(22) Filed: Dec. 3, 2012

(65) Prior Publication Data
    US 2014/0112552 A1    Apr. 24, 2014

Related U.S. Application Data

(63) Continuation of application No. 12/826,581, filed on Jun. 29, 2010, now Pat. No. 8,326,001.

(51) Int. Cl.
    *G06K 9/00* (2006.01)

(52) U.S. Cl.
    CPC ........ *G06K 9/00248* (2013.01); *G06K 9/00228* (2013.01); *G06K 9/00288* (2013.01)

(58) Field of Classification Search
    CPC ....... G06K 9/00248; G06K 9/00221–9/00315; G06T 2207/30201
    USPC ........................................................ 382/118
    See application file for complete search history.

(56) References Cited

U.S. PATENT DOCUMENTS

| | | | |
|---|---|---|---|
| 5,852,669 A | 12/1998 | Eleftheriadis et al. | |
| 5,982,912 A | 11/1999 | Fukui et al. | |
| 6,108,437 A | 8/2000 | Lin | |
| 6,111,517 A | 8/2000 | Atick et al. | |
| 6,600,830 B1 | 7/2003 | Lin et al. | |
| 6,611,613 B1 * | 8/2003 | Kang et al. | 382/118 |
| 6,975,750 B2 | 12/2005 | Yan et al. | |
| 7,130,454 B1 | 10/2006 | Berube et al. | |
| 7,200,249 B2 | 4/2007 | Okubo et al. | |
| 7,239,726 B2 | 7/2007 | Li | |
| 7,315,630 B2 | 1/2008 | Steinberg et al. | |
| 7,418,116 B2 | 8/2008 | Fedorovskaya et al. | |

(Continued)

FOREIGN PATENT DOCUMENTS

| | | | |
|---|---|---|---|
| JP | 2008066790 A | * | 9/2008 |
| WO | WO-2004010365 A2 | | 1/2004 |

OTHER PUBLICATIONS (Jari Hannuksela, "Facial Feature Based Head Tracking and Pose Estimation", 2003,Univresity of Oulu, Finland).*

(Continued)

*Primary Examiner* — Stephen R Koziol
*Assistant Examiner* — Totam Le
(74) *Attorney, Agent, or Firm* — Kenyon & Kenyon LLP

(57) ABSTRACT

Methods, systems, and apparatus, including computer programs encoded on a computer storage medium, are disclosed for reducing the impact of lighting conditions and biometric distortions, while providing a low-computation solution for reasonably effective (low threshold) face recognition. In one aspect, the methods include processing a captured image of a face of a user seeking to access a resource by conforming a subset of the captured face image to a reference model. The reference model corresponds to a high information portion of human faces. The methods further include comparing the processed captured image to at least one target profile corresponding to a user associated with the resource, and selectively recognizing the user seeking access to the resource based on a result of said comparing.

18 Claims, 10 Drawing Sheets

(56) References Cited

U.S. PATENT DOCUMENTS

| | | | |
|---|---|---|---|
| 7,466,866 B2 | 12/2008 | Steinberg | |
| 7,783,085 B2 | 8/2010 | Perlmutter et al. | |
| 8,085,996 B2* | 12/2011 | Ogawa | 382/118 |
| 8,509,539 B2* | 8/2013 | Yu et al. | 382/190 |
| 2001/0026633 A1* | 10/2001 | Abdel-Mottaleb et al. | 382/118 |
| 2005/0117026 A1 | 6/2005 | Koizumi et al. | |
| 2007/0153091 A1 | 7/2007 | Watlington et al. | |
| 2007/0154095 A1* | 7/2007 | Cao et al. | 382/190 |
| 2007/0200916 A1 | 8/2007 | Han | |
| 2008/0037838 A1* | 2/2008 | Ianculescu et al. | 382/118 |
| 2008/0080766 A1 | 4/2008 | Payonk et al. | |
| 2008/0117305 A1 | 5/2008 | Rogers et al. | |
| 2009/0082066 A1 | 3/2009 | Katz | |
| 2009/0133051 A1 | 5/2009 | Hildreth | |
| 2010/0066763 A1* | 3/2010 | MacDougall et al. | 345/656 |
| 2010/0079508 A1 | 4/2010 | Hodge et al. | |
| 2010/0172581 A1 | 7/2010 | Husoy | |
| 2011/0222556 A1 | 9/2011 | Shefler et al. | |

OTHER PUBLICATIONS (Jamie Sherrah, "Skin Colour Analysis", 2001, http://homepage.inf.ed.ac.uk/rbf/CVonline).*

Authorized Officer Brigitte Chiarizia, Invitation to Pay Additional Fees and, Where Applicable, Protest Fee, International Application No. PCT/US2011/042204, mailed Oct. 10, 2011, 5 pages.

Dave et al., "Face Recognition in Mobile Phones", Stanford University, Jun. 7, 2010.

Etemad et al., "Discriminant analysis for recognition of human face images", J. Opt. Soc. Am. A, vol. 14, No. 8, pp. 1724-1733, Aug. 1, 1997.

Ganhua Li, "An Efficient Face Normalization Algorithm Based on Eyes Detection", Oct. 9-15, 2006, 2006 IEEE/RSJ, Dept. of Automation andComputer AId Engineering—Chinese University of Hong Kong, Hongkong, China.

Gong et al., "Dynamic Vision: from Images to Face Recognition", Imperial College Press, XP-002659259, pp. 20-25, 66, 67, 92, 93, 138, 139, Jan. 1, 2000.

Guillaume, Dave, "Face Ercognition in Mobile Phones", Jun. 17, 2010, Department of Electrical Engineering, Standford University, Standford, USA.

Hadid et al., "Face and Eye Detection for Person Authentication in Mobile Phones", First ACM/IEEE International Conference, Sep. 1, 2007, pp. 101-108.

Horng et al., "Driver Fatigue Detection Based on Eye Tracking and Dynamic Template Matching", Proceedings of the 2004 IEEE International Conference on Networking, Sensing & Control, Taipei, Taiwan, Mar. 21-23, 2004, pp. 7-12.

Hsien-Che Lee, "Introduction to Color Imaging Science", ISBN-10:0521103134, Cambridge University Press, Feb. 24, 2005.

Jain et al., "An Introduction to Biometric Recognition", IEEE Transactions on Circuits and Systems for Video Technology, vol. 14, No. 1, Jan. 2004, pp. 4-20.

Koschan et al., "Digital Color Image Processing", ISBN9780-470-147085, John Wiley & Sons, Inc., 2008, pp. 44-53.

Nagel, "Algorithms and VLSI Architectures for Low-Power Mobile Face Verification", PhD Thesis, Universite de Neuchatel, Jun. 2, 2005.

Subasic et al., "Face Image Validation System", Proceedings of the 4th International Symposium on Image and Signal Processing and Analysis (2005), pp. 30-33.

Tan et al., "Face Recognition from a Single Image per Person: A Survey", Department of Computer Science and Engineering, Nanjing University of Aeronautics & Astronautics, Nanjing 210016, China; National Laboratory for Novel Software Technology,Nanjing University, Nanjing 210093, China; State Key Laboratory of Pattern Recognition, Institution of Automation, Chinese Academy of Sciences, Beijing 100080, China, pp. 1-34.

Viola et al., "Robust Real-Time Face Detection", International Journal of Computer Vision 57(2), 137-154, 2004.

Yang et al., "Face Detection and Gesture Recognition for Human-Computer Interaction", Kluwer Academic XP-002659258, pp. 12-21, Jan. 1, 2001.

Zhao et al., "Face Recognition: A Literature Survey", ACM Computing Surveys, vol. 35, No. 4, Dec. 2003, pp. 399-458.

* cited by examiner

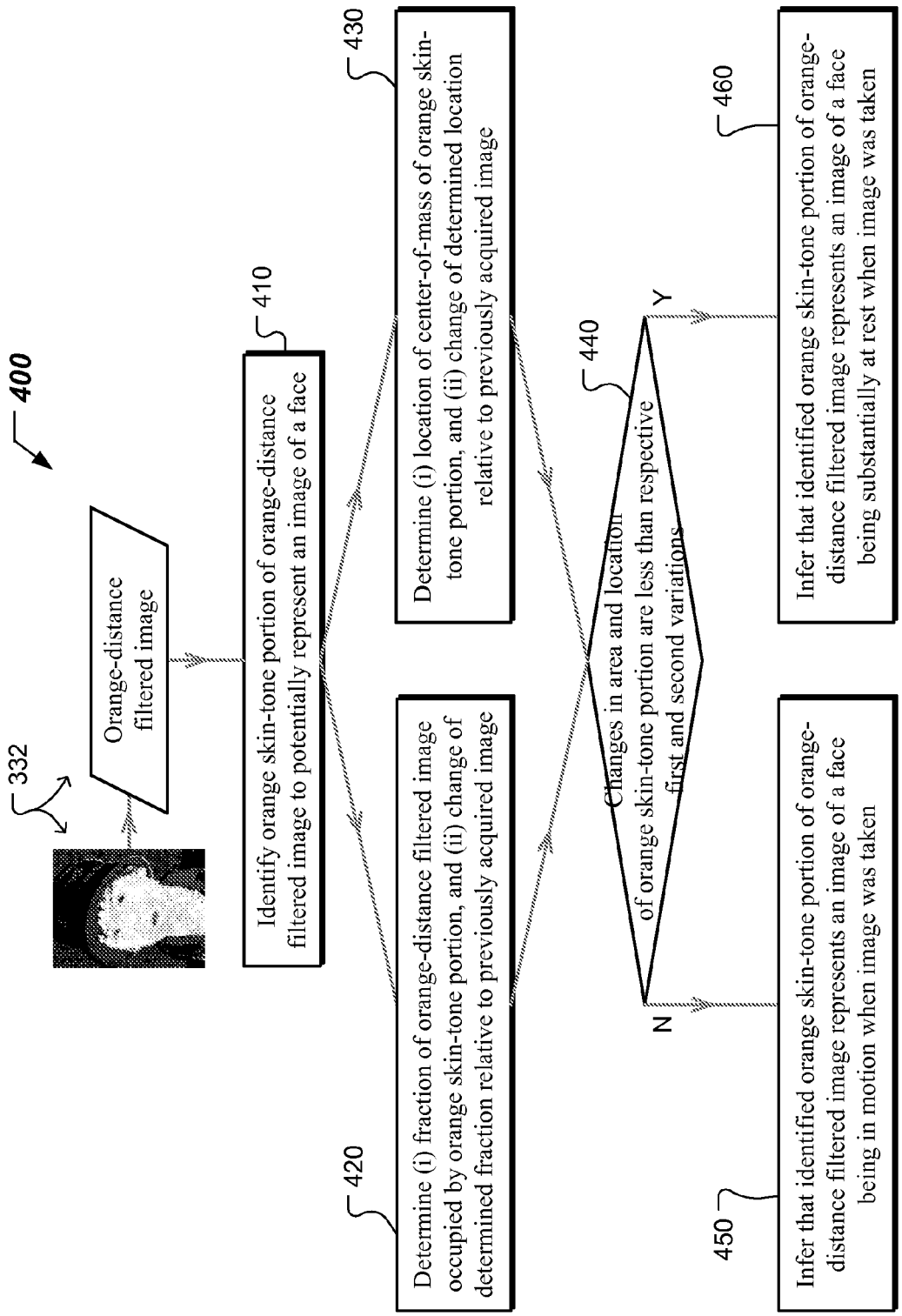

LOW THRESHOLD FACE RECOGNITION

RELATED APPLICATIONS

This application is a continuation of U.S. patent application Ser. No. 12/826,581 filed on Jun. 29, 2012, which will issue on Dec. 4, 2012 as U.S. Pat. No. 8,326,001.

BACKGROUND

This specification relates to low threshold face recognition, e.g., a face recognition system that can tolerate a certain level of false positives in making face recognition determinations.

Most face recognition systems fall into one of two categories. A first category system tends to be robust and can tackle various lighting conditions, orientations, scale and the like, and tends to be computationally expensive. A second category system is specialized for security-type applications and can work under controlled lighting conditions. Adopting the first category systems for face recognition on consumer operated portable appliances that are equipped with a camera would unnecessarily use an appliance's computing resources and drain its power. Moreover, as the consumer portable appliances tend to be used both indoor and outdoor, the second category systems for face recognition may be ineffective. Such ineffectiveness may be further exacerbated by the proximity of the user to the camera, i.e., small changes in distance to and tilt of the appliance's camera dramatically distort features, making traditional biometrics used in security-type face recognition ineffective.

SUMMARY

This specification describes technologies relating to reducing the impact of lighting conditions and biometric distortions, while providing a low-computation solution for reasonably effective (low threshold) face recognition that can be implemented on camera-equipped consumer portable appliances.

In general, one aspect of the subject matter described in this specification can be implemented in methods performed by an image processor that include the actions of processing a captured image of a face of a user seeking to access a resource by conforming a subset of the captured face image to a reference model. The reference model corresponds to a high information portion of human faces. The methods further include comparing the processed captured image to at least one target profile corresponding to a user associated with the resource, and selectively recognizing the user seeking access to the resource based on a result of said comparing.

These and other implementations can include one or more of the following features. In some cases, the high information portion includes eyes and a mouth. In some other cases, the high information portion further includes a tip of a nose. Processing the captured image can include detecting a face within the captured image by identifying the eyes in an upper one third of the captured image and the mouth in the lower third of the captured image. The reference model includes a reference image of a face, and processing the captured image further can include matching the eyes of the detected face with eyes of the face in the reference image to obtain a normalized image of the detected face. Additionally, processing the captured image can further include vertically scaling a distance between an eyes-line and the mouth of the detected face to equal a corresponding distance for the face in the reference image in order to obtain the normalized image of the detected face. In addition, processing the captured image can further include matching the mouth of the detected face to the mouth of the face in the reference image in order to obtain the normalized image of the detected face.

In some implementations, comparing the processed captured image can include obtaining a difference image of the detected face by subtracting the normalized image of the detected face from a normalized image of a target face associated with a target profile. Comparing can further include calculating scores of respective pixels of the difference image based on a weight defined according to proximity of the respective pixels to high information portions of the human faces. The weight decreases with a distance from the high information portions of the human faces. For example, the weight decreases continuously with the distance from the high information portions of the human faces. As another example, the weight decreases discretely with the distance from the high information portions of the human faces. As yet another example, the weight decreases from a maximum weight value at a mouth-level to a minimum value at an eyes-line.

In some implementations, selectively recognizing the user can include presenting to the user a predetermined indication according to a user's profile. The resource can represent an appliance, and the methods can further include capturing the image using an image capture device of the appliance. Selectively recognizing the user can include turning on a display of the appliance, if the display had been off prior to the comparison.

In some implementations, processing the captured image can include applying an orange-distance filter to the captured image, and segmenting a skin-tone orange portion of the orange-distance filtered image to represent a likely presence of a face in front of the image capture device. Processing the captured image can further include determining changes in area and in location of the skin-tone orange portion of the captured image relative to a previously captured image to represent likely movement of the face in front of the image capture device. Also, processing the captured image further can include detecting a face within the skin-tone orange portion of the orange-distance filtered image when the determined changes are less than predetermined respective variations.

According to another aspect, the described subject matter can also be implemented in an appliance including a data storage device configured to store profiles of users associated with the appliance. The appliance further includes an image capture device configured to acquire color frames. Further, the appliance includes one or more data processors configured to apply an orange-distance filter to a frame acquired by the image capture device. The one or more data processors are further configured to determine respective changes in area and location of a skin-tone orange portion of the acquired frame relative to a previously acquired frame, and to infer, based on the determined changes, a presence of a face substantially at rest when the frame was acquired. Further, the one or more data processors is configured to detect a face corresponding to the skin-tone orange portion of the acquired frame in response to the inference, the detection including finding eyes and a mouth within the skin-tone orange portion. Furthermore, the one or more data processors are configured to normalize the detected face based on locations of eyes and a mouth of a face in a reference image. In addition, the one or more data processors are configured to analyze weighted differences between normalized target faces and the normalized detected face. The analysis includes weighting portions of a face based on information content corresponding to the portions. The target faces are associated with respective users of the appliance. Additionally, the one or more data processors are configured to match the face detected in the acquired frame with one of the target faces based on a result of the analysis, and to acknowledge the match of the detected face in accordance with a profile stored on the data storage device and associated with the matched user of the appliance.

These and other implementations can include one or more of the following features. The data storage device is further configured to store rules for analyzing the weighted differences including weighting rules and scoring rules, and rules for matching the detected face against target faces.

Particular implementations of the subject matter described in this specification can be configured to realize one or more of the following potential advantages. The techniques and systems disclosed in this specification can reduce the impact of lighting and emphasize skin variance. By acquiring images with the appliance's own image capture device, the approximate location and orientation of face features can be pre-assumed and can avoid the overhead of other face recognition systems. The disclosed methods can ignore face biometrics, and rather use feature locations to normalize an image of a test face. Further, the face recognition techniques are based on a simple, weighted difference map, rather than traditional (and computationally expensive) correlation matching.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows an example of a process for detecting potential presence of a person's face in front of an image capture device and for inferring the person's level of attentiveness.

Like reference numbers and designations in the various drawings indicate like elements.

DETAILED DESCRIPTION

Computational, memory and/or power reducing techniques for performing low confidence facial recognition are disclosed including use of limited, high-information-value portions of a face to be recognized.

Figure 1:
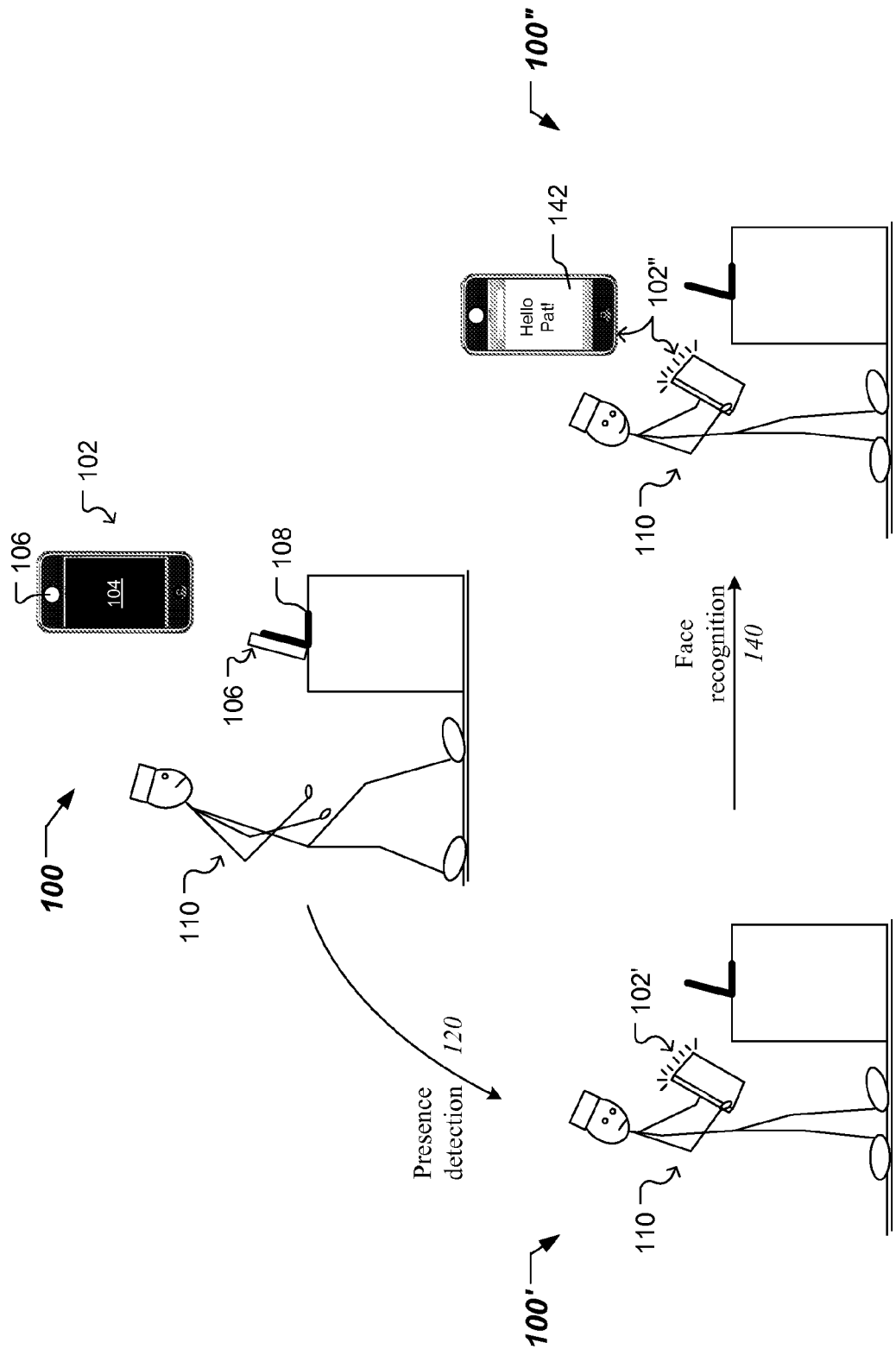
FIG. 1 shows an example of a computerized appliance for implementing the methods disclosed in this specification.

FIG. 1 shows an example of a computerized appliance 102. The appliance 102 includes a display 104 and an image capture device 106, e.g., a camera, located display-side. Under low-load, low-power consumption conditions, e.g., when the appliance 102 rests unused on a support 108, the display 104 can be turned off while the forward-looking camera 106 can remain on. Methods disclosed in this specification can be implemented by the appliance 102 for providing low threshold face recognition of a user 110 associated with the appliance 102, where there is a tolerance for a certain level of false positives.

Panel 100 shows a potential user 110 who is approaching the appliance 102. In response to the appliance 102 detecting 120 that the potential user 110 stops in front of and faces the camera 106, the appliance can transition to a new state 102' to acknowledge the presence and attention of the potential user 110, as illustrated in panel 100'. In some implementations, the appliance 102' acknowledges the presence of the potential user 110 by turning on the display 104. Further in response to detecting the presence of the potential user 110, the appliance 102' can trigger a subsequent process for recognizing 140 the potential user's face.

Responsive to the appliance 102' matching 140 the potential user's face to the face of an authorized user, the appliance can transition to a new state 102" to acknowledge the recognition of the authorized user 110, as shown in panel 100". In some implementations, the appliance 102" acknowledges the recognition of the authorized user 110 by turning on the display 104. In other implementations, the appliance 102" acknowledges the recognition of the authorized user 110 by providing authentication for outer login or other applications that have a low threshold of matching accuracy (or low confidence level that can be tolerated.) For example, the appliance 102" can be configured to recognize faces of a predetermined group (including a small number) of users that may login on the appliance 102", and can present each user with a personalized configuration 142. For example, to comply with such personalized configurations, the appliance 102" can modify screen saver slide shows or other appliance non-security preferences.

The methods disclosed in this specification can adequately recognize a user 110 associated with the appliance 102 without computing resources overhead that is characteristic of other face recognition techniques. Therefore, the face detection and recognition methods described in this specification can be implemented in hardware, for example in graphical processing units (GPUs), of computerized appliances 102. The disclosed hardware implementation has several advantages. As frames are acquired by the camera 106 of the appliance 102, the frames represent color, un-rotated digital images. In contrast, when importing an image in a software-implemented image processing application, it is unknown prior to obtaining the image whether the image is black-and-white or color. Another advantage of the disclosed implementation is that the image is taken under normal lighting (illumination) conditions, so there is little or no need for white-balance compensation.

The disclosed techniques can potentially substitute computationally expensive face recognition algorithms. For example, the disclosed techniques can run inexpensively, using little power, on mobile devices and appliances, such as smart phones, tablet computers, laptops and the like. Profiles of users used by the techniques and systems disclosed in this specification can be generated and updated through a learning process. For example, a user can self-identify when his/her picture is being taken, thus the low threshold face recognition system running on the appliance 102 can learn the features of that particular individual.

Figure 2:
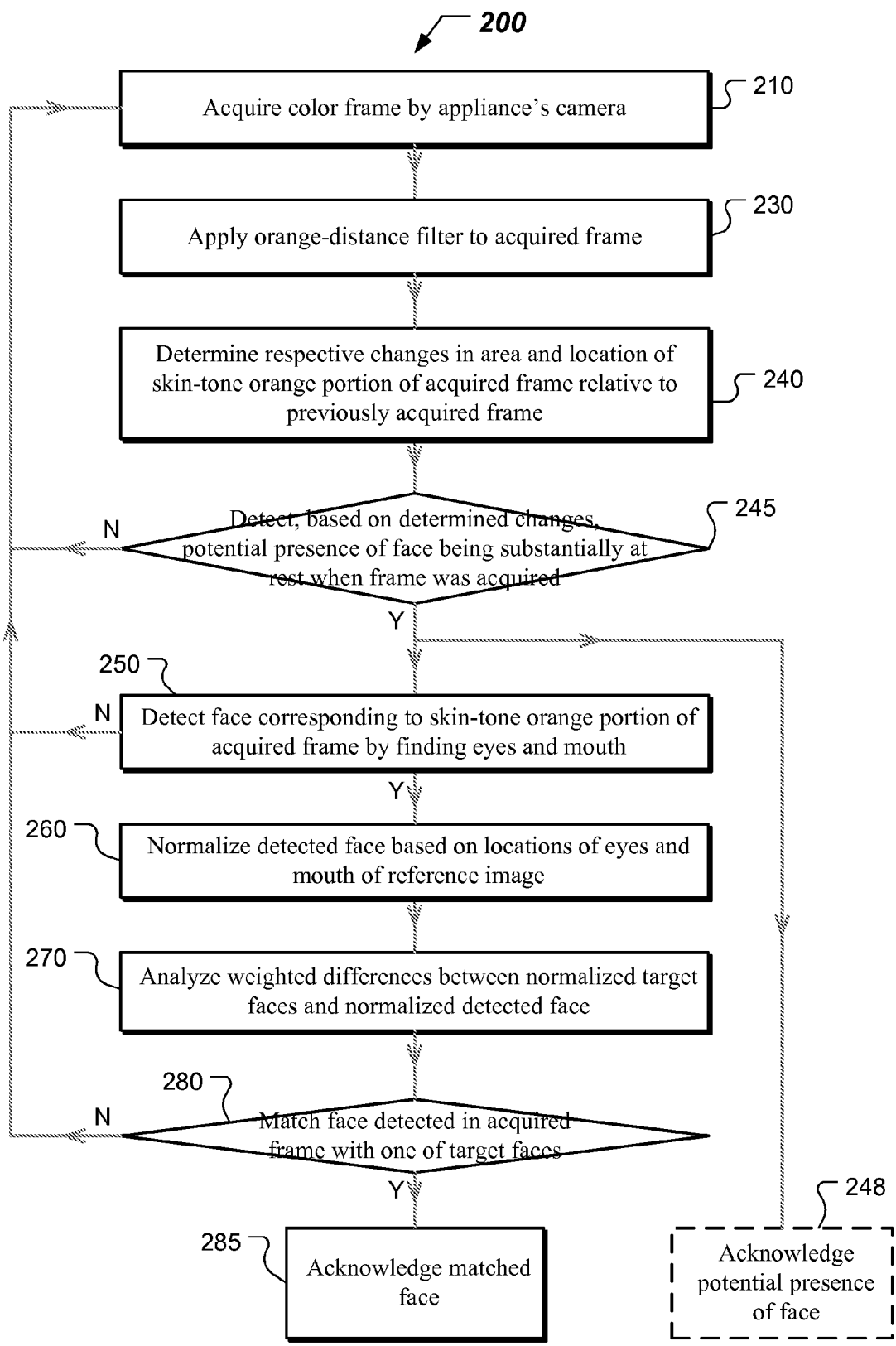
FIG. 2 shows an example process for detecting a face in a frame acquired by an image capture device of an appliance and for matching the detected face with one of target faces stored on the appliance.

FIG. 2 shows an example process 200 for matching a face detected in a frame acquired by a camera of an appliance with one of target faces stored on the appliance. In some implementations, the process 200 can be implemented in hardware or firmware of a computerized appliance equipped with a camera. A color frame is acquired 210. Referring to FIG. 1, although the display 104 of the appliance 102 is turned off, the appliance's camera 106 is on and captures frames repeatedly. In some cases, the frames can be captured at video rates. In other cases, the frames can be captured based on a predetermined schedule, e.g., a frame can be acquired every $N^{th}$ video frame, where N can be 10, 20, 120, etc.

The acquired frame is filtered 230 using an orange-distance filter. For example, referring to FIG. 1, a frame containing an image of the user 110 captured by the camera 106 of the appliance 102 is preconditioned to neutralize lighting effects and to emphasize facial features, such as freckles, skin discolorations/variations, and the like. A process for preconditioning an acquired color image using an orange-distance filter is described in detail below in connection with FIGS. 3A and 3C.

Respective changes in area and location of a skin-tone orange portion of the acquired frame are determined 240 relative to a previously acquired frame. For example, referring to FIG. 1, once a frame containing an image of a user 110 captured by the camera 106 of the appliance 102 has been preprocessed using an orange-distance filter, the orange-distance filtered image can be masked for skin-tone to locate the largest, central segment of skin-tone. Masking for skin-tone can include retaining a portion of the image having color values that are within a predetermined distance from orange. The skin-tone orange portion of the captured frame can represent the skin of user 110. Further, a skin-tone orange portion located centrally in the image can represent a face of user 110. Moreover, the appliance 102 can calculate an area of the skin-tone orange portion, e.g., as a fraction of the total image. In addition, appliance 102 can calculate a location of the skin-tone orange portion defined as pixel-coordinates (x_CM, y_CM) of the center of mass of the masked skin-tone orange portion.

By determining a change in the area of the skin-tone orange portion of the acquired frame relative to the previously acquired frame, the appliance 102 can learn whether (i) the user's face is approaching toward the front of the camera 106 (if the area of the skin-tone orange portion increases between consecutively acquired frames,) (ii) the user's face is backing away from the front of the camera 106 (if the area of the skin-tone orange portion decreases between consecutively acquired frames,) or (iii) the user's face is located at a constant distance in front of the camera 106 (if the area of the skin-tone orange portion is substantially constant between consecutively acquired frames.) In the later case (iii), the appliance 102 can also determine a change in the location of the skin-tone orange portion of the acquired frame relative to the previously acquired frame, to learn whether (iii.a) the user's face is moving laterally in front of the camera 106 (if the location of the constant-area skin-tone orange portion shifts left or right between consecutively acquired frames,) or (iii.b) the user's face is located at a fixed location in front of the camera 106 (if both the area and the location of the skin-tone orange portion remain substantially constant between consecutively acquired frames.)

If a result of the determination 240 corresponds to case (iii.b) described above, then a potential presence of a face that is at rest and faces the camera 106 is detected 245. For example, referring to FIG. 1, the skin-tone orange portion of the acquired frame can be designated as input for detecting 250 a face of a user 110 being at rest in front of and facing the camera 106 when the frame is acquired. A process for identifying potential presence of a face being at rest in front of a camera is described in detail below in connection with FIG. 4. In some implementations, detection of a potential presence of the user's face can be optionally acknowledged 248. For example, the display 204 of the appliance 102 that was previously turned off to save battery life can be turned on to acknowledge the potential presence of the user's face. If a result of the determination 240 corresponds to cases (i), (ii) or (iii.a) associated with the user's face moving in front of the camera 206, as described above, then a potential presence of a face that is at rest and faces the camera 106 is not detected 245. In this case, a subsequent frame is acquired 210 by the appliance's camera 106 and the method 200 is carried out in a manner described above.

A face corresponding to the skin-tone orange portion of the acquired frame is detected 250 by finding eyes and a mouth of the face. For example, two eyes can be detected in an upper third of the skin-tone orange portion, and a mouth can be detected in the lower third of the lowered portion. Detecting 250 the eyes and the mouth can include using algorithms based on Open CV templates for color images. Alternatively, detecting 250 the eyes and the mouth can include using algorithms based on custom generated templates for orange-distance filtered images as described below in connection with FIG. 5. If eyes and a mouth cannot be found within the skin-tone orange portion of the acquired frame, a subsequent frame is acquired 210 by the appliance's camera and the method 200 is carried out in a manner described above.

However, if eyes and a mouth can be found within the skin-tone orange portion of the acquired frame, the detected face corresponding to the skin-tone orange portion is normalized 260. As disclosed in detail below in connection with FIG. 6, centers of eyes and mouth of a reference image can be used to normalize the detected face. In some implementations, other reference points can be chosen, e.g., a combination including the eyes, and the tip of the nose, or another combination including the eyes, the mouth and the tip of the nose. Certain combinations of reference points, e.g., eyes and mouth, can be selected to minimize the effect of facial expressions and of facial hair.

Differences between normalized target faces and the normalized detected face are weighted and analyzed 270 to match the detected face with one of the target faces. For example, referring to FIG. 1, the target faces correspond to profiles of users authorized to use the appliance 102. In some implementations, multiple profiles may be associated with a given user (e.g., with/without glasses, lipstick, etc). The analysis 270 can include scoring the differences using a weight that decreases from the center of the mouth, where is has a maximum weight, to the eyes-line, where it has a minimum weight, for instance. This is based on the assumption that people maintain fixed expressions while reading from a display 104 of an appliance 102, and that the lip proportions are substantially invariant past a certain age (excluding the advent of a stroke). Such an analysis including a 2D-correlation matching of normalized acquired and target images based on distances between certain reference points can be performed inexpensively unlike other computationally expensive face matching algorithms. A process for performing a weighted analysis of differences between target faces and a detected face is described in detail below in connection with FIG. 7.

When the analysis 270 results in a match 280 between the detected face and one of the target faces based, the matched face can be acknowledged 285. For example, referring to FIG. 1, the display 104 of the appliance 102 that had been turned off to save battery life can be turned on upon recognizing 280 the face of user 110. In some implementations, given states/ configurations can be triggered in the appliance 110 when a matching score passes a selected threshold (which may be user-defined). However, when the analysis 270 results in a mismatch 280 between the detected face and any one of the target faces, a subsequent frame is acquired 210 by the appliance's camera 106 and the method 200 is carried out in a manner described above.

An example use case illustrated in FIG. 1 depicts a user 110 that approaches an appliance 102 having its display 104 turned off to save battery life. The appliance's camera 106 is on and captures an image of the user 110 that stops in front of and faces the appliance 102. The appliance 102 can perform the process 200 described above on the captured image and may determine that the captured image of the user 110 matches a particular profile. In some implementations, the appliance 102 can ask the user 110 to confirm the determined profile. Upon user confirmation, the appliance 102 may present the user 110 with an appropriate profile. Authentication can be used by the appliance 102 for training the stored user profiles.

Figure 3A:
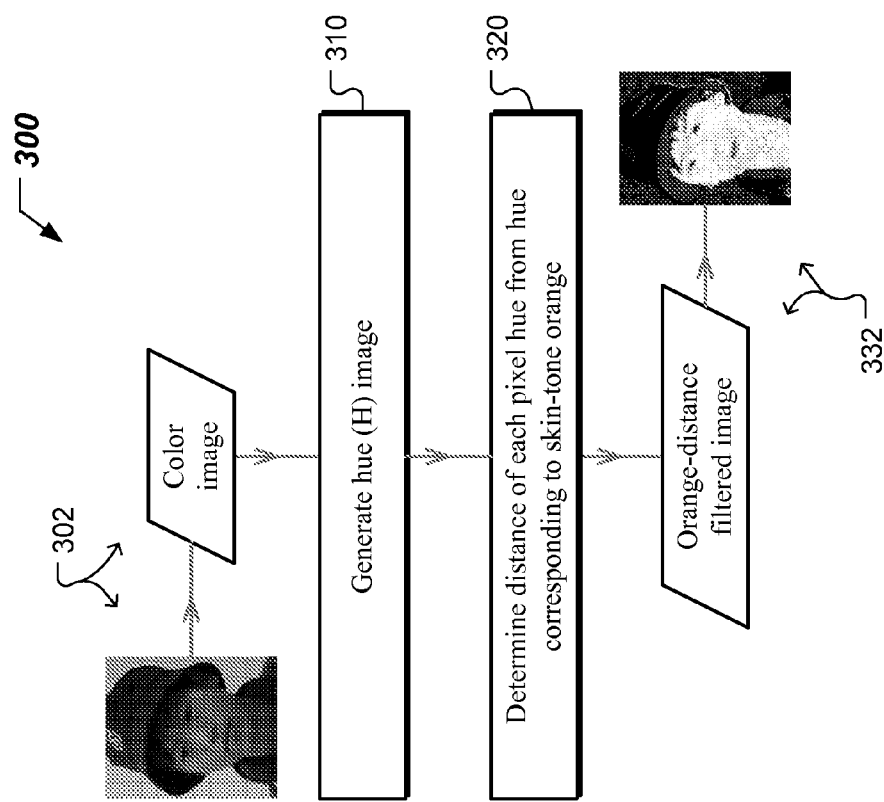
FIG. 3A shows an example of a process for preprocessing a color digital image by using an orange-distance filter.

FIG. 3A shows an example of a process 300 for preprocessing a color digital image 302 (referred to as color image) by using an orange-distance filter. In some implementations, the process 300 can be performed by a computerized device and can be implemented in any one or a combination of hardware, firmware and software. For example, referring to FIG. 1, the color image 302 can represent a frame captured by the appliance's camera 106. As another example, the color image can be obtained from a library of digital assets stored on a store of a computerized device.

Some image processing applications can perform skin-tone recognition by defining a target polygon within the red-green-blue (RGB) color space to represent skin color. Such image processing applications can verify whether the color detected in a pixel of an image is within the target polygon to determine whether the pixel corresponds to skin color. Such an approach for identifying portions of an image corresponding to skin-tone can be computationally expensive. In the case of method 300, the color image 302 is converted to a hue image, for increasing processing speed while reducing computational resources.

In some implementations, generating 310 the hue image includes converting the color image 302 from RGB color space to hue-saturation-luminosity (HSL) color space—where red corresponds to 0 degrees, green 120 degrees and blue 240 degrees. The lightness and saturation of analyzed pixels can be ignored (if an analyzed pixel has a ratio of chroma/saturation equal to 0, unless the analyzed pixel is pure white or pure black), and the hue of the analyzed pixels is compared to a predetermined hue interval (angular interval). In some implementations, generating 310 the hue image includes using a partial HSL conversion. An example of code that can be executed to generate the hue image starting from the color image 302 in RGB color space is described below (pixel[3] defines the input RGB color):

```
int hv = 0;
int lv = 255;
int h,l;
for (int i=0; i<3; i++)
{
    if (pixel[i]>hv)
    {
        hv = pixel[i];
        h = i;
    }
    if (pixel[i] < lv)
```

```
    {
        lv = pixel(i);
        l= i;
    }
}
// Get chroma
int c = hv-lv;
if (!c) exit 0; // No hue!
// Get hue
int hue = ((h?h:3)*120 + 60*(pixel[(h+1)%3]-pixel[(h+2)%3])/c) % 360.
```

An orange-distance filtered image 332 can be generated by determining 320 a distance of each pixel hue from skin-tone hue. In implementations corresponding to hue-based color spaces (HSL color space and similar), the center of the hue interval corresponding to skin-tone can be chosen to be 25 deg (which is a hue value corresponding to skin-tone orange). In this case, the hue of an analyzed pixel can be characterized in terms of the distance from 25 deg (i.e., from orange) to the hue value of the analyzed pixel. For example, an orange-distance filtered image 332 can be generated by subtracting a value associated with skin-tone orange from the hue value corresponding to each pixel. As illustrated in FIG. 3A, the orange-distance filtered image 332 can be represented using 8-bits (256 levels), where a difference of zero degrees (orange) corresponds to 0, and a difference of ±180 degrees corresponds to 255.

Additionally, an example of code that can be executed to calculate the score (value) of a pixel of the orange-distance filtered image 332 is described below:

```
int s = hue – ORANGE_VALUE;
if (s > 180) s-= 360;
s = ORANGE_THRESH – abs(s);
if (s < 0) s = 0;
float score = (s*255)/ORANGE_THRESH;
```

As discussed above, an ORANGE_VALUE can be chosen to be 25, and an ORANGE_THRESH can be chosen to be 30. In implementations corresponding to 2-dimensional Cartesian hues, such as YUV color space, determining 320 a distance in hue space can include calculating a Cartesian distance from a point equivalent to skin-tone orange to the analyzed pixel.

Figure 3B:
FIGS. 3B, 3C and 3D are unprocessed and processed versions of an example color image.
Figure 3C:
Figure 3D:

Application of an orange-distance filter in accordance with method 300 prior to using targeted classifiers for facial features, and the like, generated for orange-distance filtered images, as described below in connection with FIG. 5, can potentially improve accuracy for skin-tone detection. FIG. 3B shows an example color image 302' acquired with a digital camera. The color image 302' includes a texture map represented in RGB color space, and regions of interest of color image 302' can include the subjects' skin 305, 306. FIG. 3C shows an image 332' obtained from the image 302' of FIG. 3B after application of an orange-distance filter. For example, the image 302' can be processed using the method 300 to generate image 332'. The skin-tone orange portions of the orange-distance filtered image 332', represented by pixel values at or near 255 in this example, correspond to skin-tone. For example, regions of interest for image 332' can include the subject's skin 335, 336. Such regions of interest of the orange-distance filtered image 332' corresponding to skin-tone can be targeted for subsequent processing as discussed below in connection with FIGS. 4-7. As shown in FIG. 3C, lighting effects on the skin-tone regions of the orange-distance filtered image 332' have been neutralized and facial features have been emphasized. Image 342 illustrated in FIG. 3D can be obtained from image 302' by applying a grey-scale transformation. In contrast with image 332', regions of image 342 corresponding to regions of interest (e.g., the subjects' skin 345, 346) share a common range of the grey scale with other regions 347, 348 of image 342 that do not correspond to the regions of interest.

FIG. 4 shows an example of a process 400 for detecting potential presence of a person's face in front of a camera and for inferring the person's level of attentiveness. In some implementations, the process 400 can be performed by a computerized device and can be implemented in any one or a combination of hardware, firmware and software. For example, referring to FIGS. 1 and 3A, frames that are sequentially acquired by the appliance's camera 106 can be further preprocessed according to the method 300 to obtain orange-distance filtered images 332. The method 400 can process the obtained orange-distance filtered images 332 to determine whether an image of a person's face has been captured within a frame acquired by the appliance's camera 106 and to infer whether the person pays attention to the appliance 102. A display 104 of the appliance 102 can be turned on upon a positive outcome of the process 400.

A skin-tone orange portion of an orange-distance filtered image 332 is identified 410. Pixels having hue values for which respective distances to skin-tone orange are less than a threshold distance (e.g., 30 degrees from skin-tone orange—25 degrees—for HSL color space,) can be attributed to an image of a person's face. For such pixels, distances from respective hue values to orange skin-tone can be inverted and used as confidence scores. For example, if the distance from a hue value to skin-tone corresponding to a given pixel is 0, the confidence level is 100% that the hue of the given pixel matches skin-tone orange. Pixels having hue values for which respective distances to skin-tone orange are beyond the threshold distance can be masked out and ignored for subsequent analyses. Accordingly, method 400 can be implemented in hue space independently of brightness (luminosity and saturation dimensions of the color space). Thus, the effects of ethnicity and of highlights/shadows may be attenuated.

A fraction of a frame that is filled by a skin-tone orange portion of the image can be determined 420(i). The fraction can be calculated as a ratio of a number of pixels corresponding to skin-tone orange to a total number of pixels of the image and represents an area of the skin-tone orange portion. Further, a change of the skin-tone orange portion's area relative to the orange-distance filtered previously acquired image is determined 420(ii). For example, referring to FIG. 1, if the fraction of the skin-tone orange portion increases, a person 110 may be moving closer to the camera 106, while if the fraction of the skin-tone orange portion decreases, a person 110 may be moving back from the camera 106.

Additionally, a location of the skin-tone orange portion is determined 430(i). The location can be calculated as a pixel (x_CM, y_CM) corresponding to a center of mass of the skin-tone orange portion. The x-coordinate of the center of mass x_CM can be calculated as $1/n*Sum\_\{i<=n\}(x\_i)$, where n is the number of pixels in the skin-tone orange portion, and x_i is the x-coordinate of the $i^{th}$ pixel of the skin-tone orange portion, where i=1, 2, ..., n. Similarly, the y coordinate of the center of mass y_CM can be calculated as $1/n*Sum\_\{i<=n\}(y\_i)$, where n is the number of pixels in the skin-tone orange portion, and y_i is the x-coordinate of the $i^{th}$ pixel of the skin-tone orange portion, where i=1, 2, ..., n. Further, a change of the skin-tone orange portion's location relative to the orange-distance filtered previously acquired image is determined 430(ii). For example, referring to FIG. 1, if the center of mass (x_CM, y_CM) of the skin-tone orange portion changes location (i.e., drifts, shifts, oscillates, etc.,) the person 110 may be moving laterally in front of the camera 106.

The determined changes in area and position of the skin-tone orange portion of the analyzed orange-distance filtered image 332 relative to the orange-distance filtered previously acquired image are compared 440 with first and second predetermined variations, respectively. For example, referring to FIG. 1, the appliance 102 infers 450 that a user's face is moving toward or backing away from the front of the camera 106 if the skin-tone orange portion increases or decreases, respectively, by more than a first predetermined relative variation, e.g., 5%, between orange-distance filtered images 332 that have been consecutively acquired. As another example, the appliance 102 infers 450 that a user's face is moving laterally in front of the camera 106 if the location of the skin-tone orange portion changes by more than a second predetermined variation, e.g., 5 pixels, between orange-distance filtered images 332 that have been consecutively acquired.

However, the appliance 102 infers 460 that a user's face is substantially at rest when the orange-distance filtered image was taken if the determined changes in area and position of the skin-tone orange portion of the analyzed orange-distance filtered image relative to the orange-distance filtered previously acquired image are respectively less than the first and second predetermined variations.

In some implementations, method 400 can be used in combination with method 300 by an appliance 102 to detect presence and/or motion of skin-tone in sequentially acquired video frames. In this manner, a display 104 of the appliance 102 may be switched off if no moving skin-tone is detected in the field of view of the appliance's video camera 106.

Figure 5:
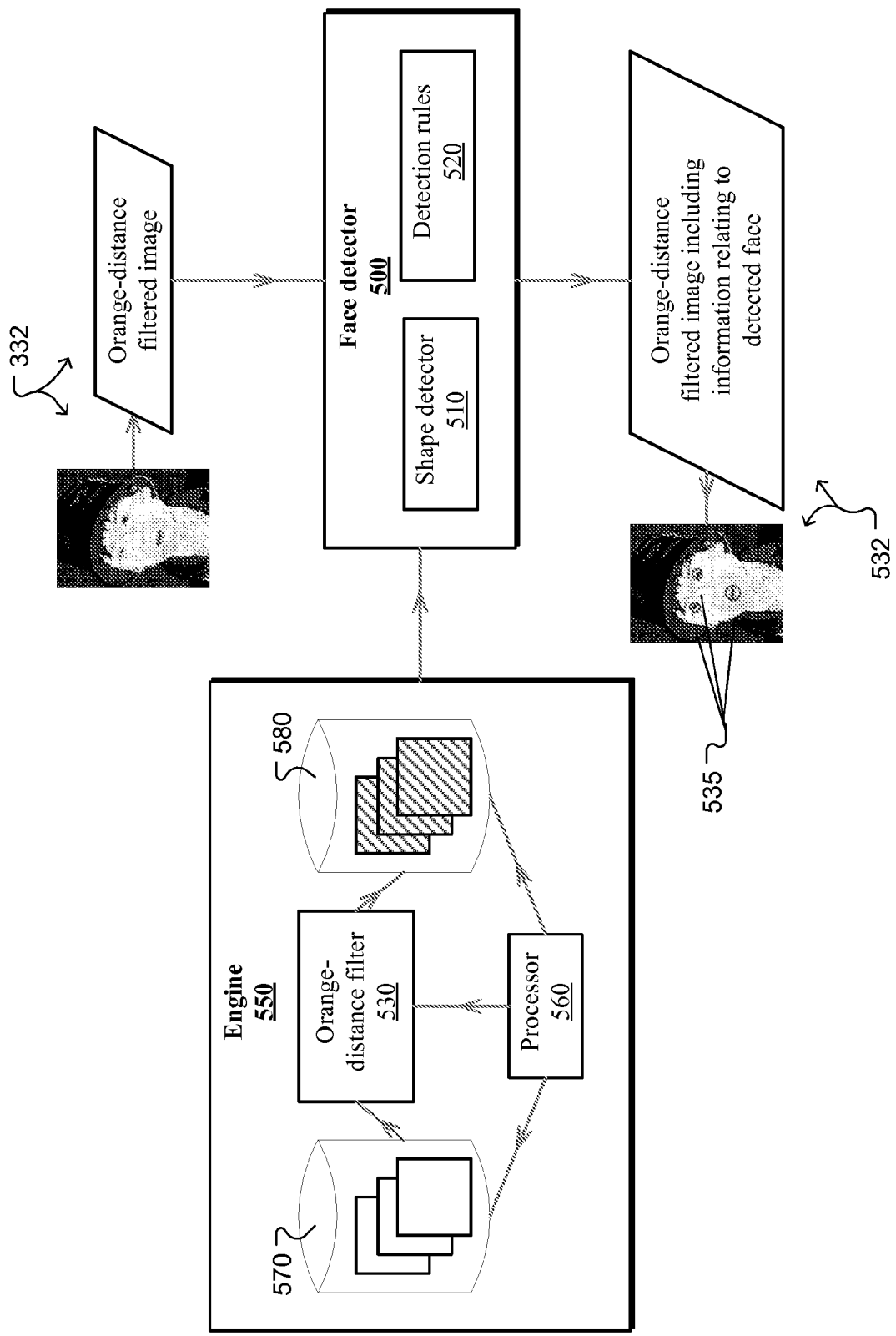
FIG. 5 shows a face detector configured to use shape detection profiles generated by an engine to perform face detection in an orange-distance filtered image.

FIG. 5 shows a face detector 500 configured to use shape detection profiles generated by an engine 550 to perform face detection in an orange-distance filtered image 332. The face detector 500 includes a shape detector 510 configured to detect eyes, a mouth, a nose, and the like, based on a combination of detection rules 520 and shape classifiers 580 corresponding to orange-distance filtered images 332.

In some implementations, the face detector 500 can be implemented in any one or a combination of hardware, firmware and software of a computerized device. For example, referring to FIGS. 1, 3A and 4, frames that are sequentially acquired by the appliance's camera 106 can be preprocessed in accordance with the method 300 to obtain orange-distance filtered images 332. The preprocessed images 332 can be further segmented 410 into skin-tone orange portions according to method 400 to identify the likely location of a face. The face detector 500 is configured to (i) detect a face within the segmented skin-tone orange portions, and to (ii) generate information 535 including at least locations of the detected eyes, the mouth, and like. The circles 535 do not appear in the actual processed image 532, instead they are illustrated in FIG. 5 for annotation purposes. In some implementations, the orange-distance filtered image 532 including information 535 relating to the detected face can be further processed to recognize the detected face among one or more target faces, and to turn on a display 104 of an appliance 102 associated with the recognized face, for instance.

Object detection technologies can use an engine 550 for generating shape classifiers (also known as profiles or templates) corresponding to various parts (components, portions, and the like) of the object to be detected. In some implementations relating to face detection, the engine 550 for generating the shape classifiers contains at least a hardware processor 560 and a classification library 570 including images of shapes to be classified and identified, for example, nose shapes (frontal view, side view, etc.), eye shapes, mouth shapes, lip proportions, etc. Images in the classification library 570 can be preprocessed by the processor 560 with a variety of filters, such as edge-enhancement filters, Gaussian blur filters, sharpening filters, and the like.

Additionally, the processor 560 can apply an orange-distance filter 530 to the images in the classification library 570 to obtain a classification library 580 of orange-distance filtered images. The classifiers generated by the engine 550 in this manner and stored in classification library 580 represent combinations of shape images and their corresponding information including (i) geometrical locations of various shapes within a face and (ii) distances between hue values and orange skin-tone for the various shapes. Moreover, the shape templates built by processor 560 in the manner described above and stored in the custom generated classification library 580 can be used for face detection within orange-distance filtered images 332.

The location of a face can be identified within an orange-distance filtered image 332 in accordance with method 400. Based on a likely orientation of the detected face (e.g., vertical orientation as depicted in the orange-distance filtered image 332), the shape detector 510 can locate the eyes and the mouth in the upper ⅓ and the lower ⅓, respectively, of the identified face area in accordance with detection rules 520 maintained by the face detector 500, and according to a subset of shape classifiers 580 for detecting at least the face, eyes, mouth and their relative locations 535 within orange-distance filtered images. In some implementations, the foregoing detection rules 520 about the relative locations of the eyes and mouth with respect to the face area allows the shape detector 510 to use primitive algorithms for eyes and mouth detection obtained from the engine 550. The use of such primitive algorithms enables implementation of the face detector 500 in hardware, for example in one or more GPUs of the appliance 102, such that the face detector 500 can be operated with minimal battery consumption by the appliance 102.

Figure 6:
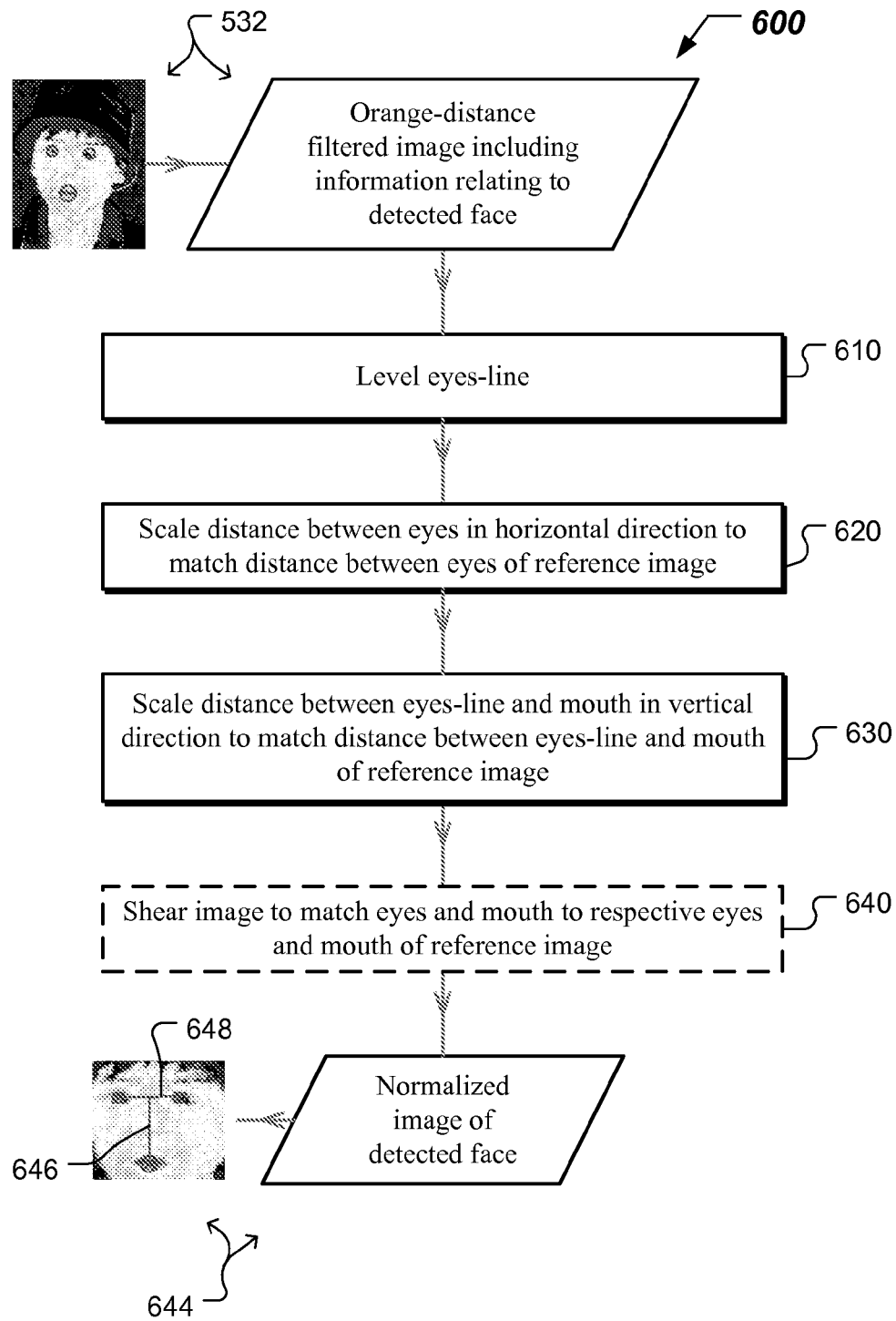
FIG. 6 shows an example of a process for normalizing an image including information relating to a detected face.

FIG. 6 shows an example of a process 600 for normalizing an image that includes information relating to a detected face. In some implementations, the process 600 can be performed by a computerized device and can be implemented in any one or a combination of hardware, firmware and software. In some implementations, the image to be normalized can be an orange-distance filtered image 532 including information relating to a detected face. For example, referring to FIGS. 1, 3A, 4 and 5, frames that are sequentially acquired by the appliance's camera 106 can be preprocessed according to the method 300 to obtain orange-distance filtered images 332. The preprocessed images 332 can be further segmented 410 into skin-tone orange portions according to method 400 to identify the likely location of a face. A face detector 500 can (i) detect a face within the segmented skin-tone orange portions, and can (ii) generate information including locations the detected face's eyes and mouth. The method 600 can process the obtained orange-distance filtered image 532 including information relating to the detected face to generate a normalized image 644 of the detected face. In some implementations, the normalized image 644 of the detected face can be further processed to recognize the detected face among one or more target faces, and to turn on a display 104 of an appliance 102 associated with the recognize face, for example.

In some implementations, once the locations 535 of the eyes and of the mouth have been identified, the image of the detected face 532 can be normalized in terms of orientation and scale to a reference image corresponding to a face. For example, the reference image can have a predetermined rectangular shape. As another example, the reference image can be a unit square image corresponding to a matrix of 512×512 elements. The reference unit can include normalized positions of the eyes and the mouth. In an exemplary implementation, the eyes of the face in the reference image are placed 25% in from the vertical edges of the reference image and 34.375% down from the top of the image. Further corresponding to the exemplary implementation, the mouth is placed 15.625% up from the bottom of the reference image.

The normalization process 600 includes rotating 610, horizontally scaling 620 and vertically scaling 630 an image 532 including information about a detected face to place the eyes and mouth of the detected face at fixed locations that correspond to respective eyes and mouth locations of a reference image as described above. A line passing through the detected eyes is leveled 610. For example, the identified positions of the eyes can be rotated to correct for a cocked orientation of the face in the image, such that the eyes-line in the acquired image is parallel to the line including centers of the eyes in the reference image. Additionally, a distance between the leveled locations of the detected eyes can be scaled 620 in horizontal direction. For example, the distance between the detected eyes can be stretched or compressed to match the locations of the eyes in the reference image. In addition, a distance from the leveled line that passes through the detected eyes to the detected mouth is scaled 630 in vertical direction. For example, the distance between the eyes-line and the mouth in the acquired image can be stretched or compressed to match a distance between eyes-line and mouth of the reference image.

In some implementations, the image 532 of the detected face can be optionally sheared 640. For example, in addition to the rotation aspect 610 and horizontal 620 and vertical 630 scaling aspects, the image 532 of the detected face can be sheared to match the detected eyes and mouth locations to respective locations of eyes and mouth of the reference image. In this case, perpendicular segments 646 and 648 which are associated with the normalized image 644 of the detected face are positioned such that the segment 646 has one end at a center of the mouth and the other end at a center of the segment 648. Segment 648 connects the centers of the eyes. In other implementations, no shearing is applied to the image 532 of the detected face. In this other case, perpendicular segments 646 and 648 associated with the normalized image 644 of the detected face are positioned such that the segment 646 has one end at a center of the mouth and the other end at an arbitrary point of the segment 648. Once again, segment 648 connects the centers of the eyes. The lines 646, 648 and the circles illustrated in FIG. 6 are for annotation purposes—they may not appear in the actual normalized image 644.

Figure 7:
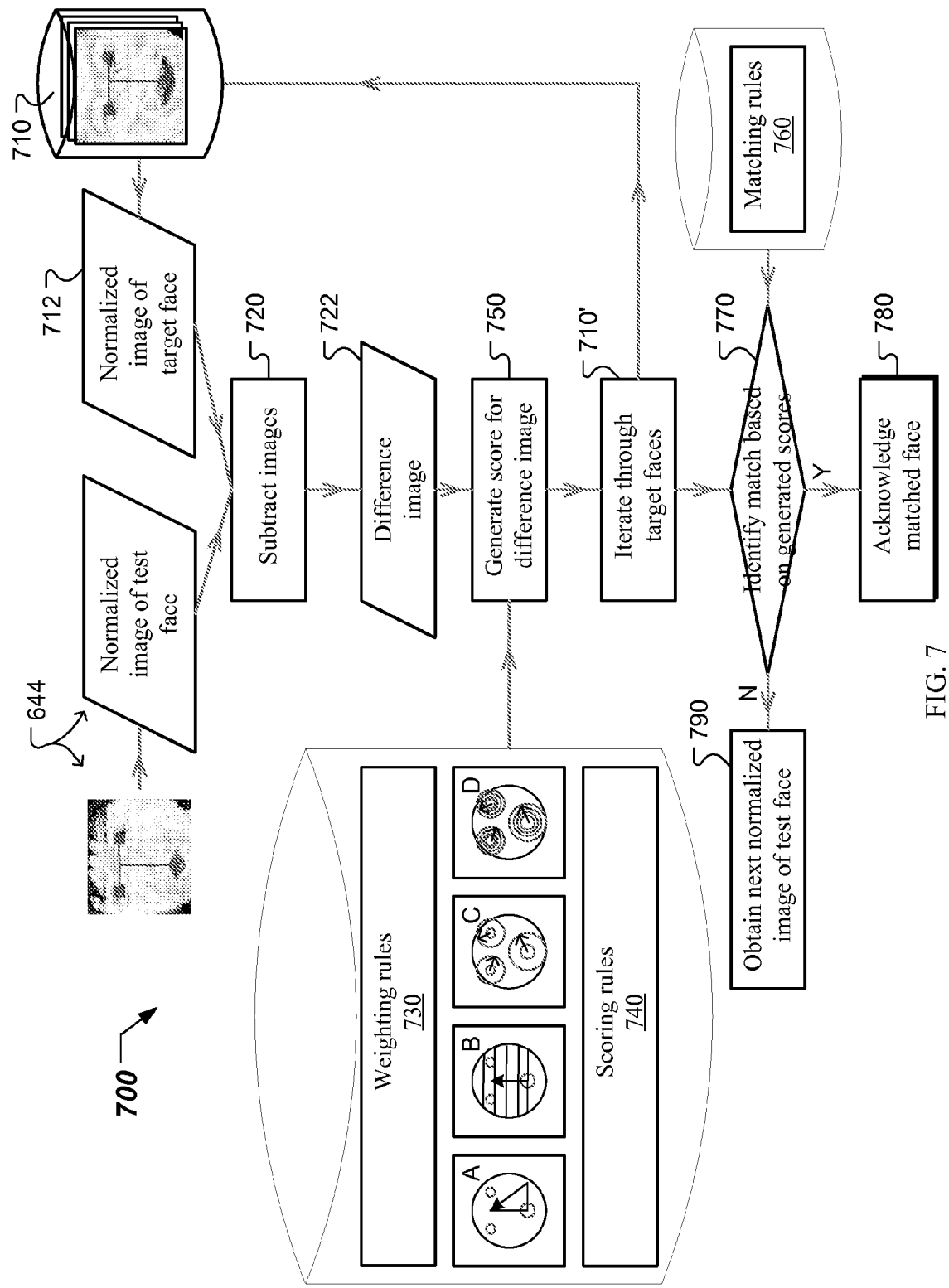
FIG. 7 shows an example of a process for matching a normalized image of a test face with a normalized image of a target face.

FIG. 7 shows an example of a process 700 for matching a normalized image of a test face 644 with a normalized image 712 of a target face. In some implementations, the process 700 can be performed by a computerized device and can be implemented in any one or a combination of hardware, firmware and software. For example, referring to FIGS. 1, 3A and 4-6, frames that are sequentially acquired by the appliance's camera 106 can be preprocessed according to the method 300 to obtain orange-distance filtered images 332. The preprocessed images 332 can be further segmented 410 into skin-tone orange portions according to method 400 to identify the likely location of a face. A face detector 500 can (i) detect a face within the segmented skin-tone orange portions, and can (ii) generate information including locations the detected face's eyes and mouth. The method 600 can be used to normalize the image 644 of the detected face. The method 700 can process the normalized image 644 of the detected face to recognize the detected face among one or more target faces 710 corresponding to profiles of users associated with the appliance 102. A user profile may include one or more normalized target images including respectively images of the user wearing or not wearing glasses, having different hair styles, and the like.

The normalized image 644 of a test face can be iteratively 710' compared with each of target faces 710 based on two-dimensional (2D)-correlation matching 750. The 2D-correlation matching 750 used in method 700 is based on generating 720 a difference map between the two images, in contrast to other complex correlation matching algorithms that are based on correlations of the underlying face-shapes. Moreover, the 2D-correlation matching 750 can be performed in accordance with weighting rules 730 and scoring rules 740 maintained by the computerized device configured to execute the process 700.

The normalized image 644 of the test face is subtracted 720 from a normalized image 712 of a first target face. A result of the subtraction 720 is a difference image 722. For example, the difference image represents a unit square matrix of 512× 512 elements, where a given element is a difference between a value of the given element of the test image 644 and a value of the given element of the target image 712.

A score is generated 750 for the difference image 722. The score for the difference image 722 is generated 750 based on weighting rules 730. In some implementations, a highest value can be assigned to information originating from the mouth region, and the values can gradually decrease for information originating from regions near the eyes. For example, information that originates above the mouth can be weighted with highest values because the features of the upper lip, of the area between the mouth and the nose, and of the lower part of the nose tend to be unique features characteristics to a given user. In contrast, information collected from the eyes region tends to be more common across users, and thus may be worth less. An example of a weight corresponding to these implementations is weight 730-A which changes continuously in the vertical direction, from a maximum value at mouth-level to a minimum value at eye-level. Another example of a weight corresponding to these implementations is weight 730-B which changes discretely (based on bands of finite-height) in the vertical direction, from a maximum value corresponding to a band at mouth-level to a minimum value corresponding to a band at eye-level.

In other implementations, a highest value can be assigned to information originating from predetermined regions of the face, e.g., the mouth region, and the regions of the eyes, and the values can gradually decrease for information originating from regions that are radially farther from the predetermined regions. An example of a weight corresponding to these other implementations is weight 730-C which decreases continuously in the radial direction, from respective maximum values corresponding to the mouth-location, and to the eyes locations. Another example of a weight corresponding to these other implementations is weight 730-D which decreases discretely (based on radial-bands of finite-width) in radial direction, from respective maximum values corresponding to the mouth-location, and to the eyes locations.

The score for the difference image 722 is further generated 750 based on scoring rules 740. In some implementations, the weighted or un-weighted absolute values of the differences corresponding to the elements of the difference image 722 can be summed to provide a result of the 2D-correlation. In some implementations, the weighted or un-weighted differences corresponding to the elements of the difference image 722 can be averaged to provide a result of the 2D-correlation. Once a score has been generated 750 for a difference image 722 which resulted from subtracting 720 the normalized image 644 of the test face from the normalized image 712 of a first target face, method 700 continues to iteratively generate 710' 2D-correlation scores in the manner described above for the remaining target faces 710.

Matching rules 760 maintained by the computerized device configured to execute the process 700 along with the generated scores can be used to identify 770 a match between the normalized image 644 of the test face and a normalized image of one of the target faces 710. The scores of the 2D-correlations between the respective normalized images of target faces 710 and the normalized image 644 of the test face can be compared 770 with each other. A match is identified 770 between the test face and the target face corresponding to a highest 2D-correlation score if the highest correlation score exceeds a predetermined level. For example, the predetermined level can be 95% correlation between a test and a target image. In this situation, the match is acknowledged 780, e.g., based on a profile of the recognized user. For example, the appliance 102 may turn on its display 104 in response to a successful authentication of any of the authorized users, for instance. Other examples of such acknowledgment 780 were described above in connection with FIGS. 1 and 2. Moreover, each successful authentication 770 can be used by the appliance 102 executing method 700 for training any or all of the weighting rules 730, scoring rules 740 and matching rules 760.

A mismatch is identified 770 between the test face and the target faces 710 if the highest correlation score is less than or equal to the predetermined level. For example, the correlation between the test image and the target image corresponding to the highest correlation score may be less than 95%. In this situation, another normalized image of the test face or a normalized image of another test face can be obtained prior to repeating method 700.

A multitude of computing devices may be used to implement the systems and methods described in this document, as either a client or as a server or plurality of servers. A computing device can be implemented in various forms of digital computers, such as laptops, desktops, workstations, personal digital assistants, servers, blade servers, mainframes, and other appropriate computers. Another computing device can be implemented in various forms of mobile devices, such as personal digital assistants, cellular telephones, smartphones, and other similar computing devices. Additionally, computing devices can include Universal Serial Bus (USB) flash drives. The USB flash drives may store operating systems and other applications. The USB flash drives can include input/output components, such as a wireless transmitter or USB connector that may be inserted into a USB port of another computing device. The components described here, their connections and relationships, and their functions, are meant to be exemplary only, and are not meant to limit implementations of the inventions described and/or claimed in this document.

A computing device can include a processor, memory, a storage device, a high-speed interface connecting to memory and high-speed expansion ports. The computing device can further include a low speed interface connecting to a low speed bus and a storage device. Each of the above components can be interconnected using various busses, and may be mounted on a common motherboard or in other manners as appropriate. The processor can process instructions for execution within the computing device, including instructions stored in the memory or on the storage device to display graphical information for a GUI on an external input/output device, such as a display coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory can store information within the computing device. In one implementation, the memory can be a volatile memory unit or units. In another implementation, the memory can be a non-volatile memory unit or units. The memory may also be another form of computer-readable medium, such as a magnetic or optical disk.

The storage device can provide mass storage for the computing device. In one implementation, the storage device may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory, the storage device, or memory on processor.

The high speed controller can manage bandwidth-intensive operations for the computing device, while the low speed controller can manage lower bandwidth-intensive operations. Such allocation of functions is exemplary only. In one implementation, the high-speed controller can be coupled to memory, to a display (e.g., through a graphics processor or accelerator), and to high-speed expansion ports, which may accept various expansion cards. In the implementation, low-speed controller can be coupled to the storage device and the low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more computing devices or mobile devices, and an entire system may be made up of multiple computing devices and mobile devices communicating with each other.

A mobile device can include a processor, memory, an input/output device such as a display, a communication interface, and a transceiver, among other components. The mobile device may also be provided with a storage device, such as a microdrive or other device, to provide additional storage. Each of the above components is interconnected using various buses, and several of the components may be mounted on a common motherboard or in other manners as appropriate.

The processor can execute instructions within the mobile device, including instructions stored in the memory. The processor of the mobile device may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the mobile device, such as control of user interfaces, applications run by the mobile device, and wireless communication by the mobile device.

The processor of the mobile device may communicate with a user through control interface and display interface coupled to a display. The display may be, for example, a Thin-Film-Transistor Liquid Crystal display or an Organic Light Emitting Diode display, or other appropriate display technology. The display interface may include appropriate circuitry for driving the display to present graphical and other information to a user. The control interface may receive commands from a user and convert them for submission to the processor of the mobile device. In addition, an external interface may provide in communication with processor of the mobile device, so as to enable near area communication of the mobile device with other devices. The external interface may provide, for example, for wired communication in some implementations, or for wireless communication in other implementations, and multiple interfaces may also be used.

The memory stores information within the computing mobile device. The memory can be implemented as one or more of a computer-readable medium or media, a volatile memory unit or units, or a non-volatile memory unit or units. An expansion memory may also be provided and connected to the mobile device through an expansion interface, which may include, for example, a SIMM (Single In Line Memory Module) card interface. Such expansion memory may provide extra storage space for the mobile device, or may also store applications or other information for the mobile device. Specifically, expansion memory may include instructions to carry out or supplement the processes described above, and may include secure information also. Thus, for example, expansion memory may be provide as a security module for the mobile device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

The mobile device may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, WiFi, or other such transceiver (not shown). In addition, GPS (Global Positioning System) receiver module may provide additional navigation- and location-related wireless data to the mobile device, which may be used as appropriate by applications running on the mobile device.

The mobile device may also communicate audibly using audio codec, which may receive spoken information from a user and convert it to usable digital information. Audio codec may likewise generate audible sound for a user, such as through a speaker, e.g., in a handset of the mobile device. The sound may include sound from voice telephone calls, may include recorded sound (e.g., voice messages, music files, etc.) and may also include sound generated by applications operating on the mobile device.

The mobile computing device may be implemented in a number of different forms. For example, it may be implemented as a cellular telephone. It may also be implemented as part of a smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An image processing method, the method comprising:
   determining a skin tone hue value;
   determining if each pixel's hue value in an image is within a range defined by a radial distance from the skin tone hue value;
   for pixels that are not within the range, excluding the pixels' values from the image processing;
   for pixels that are within the range, increasing a score of each such pixel;
   performing facial recognition based on the remaining pixel scores, detecting parts of a face using shape detection, and
   recognizing specific ranges of distance from the skin tone hue value correlated with specific parts of the face.

2. The method of claim 1, further comprising:
   determining the radial distance for each pixel's hue value from the skin tone hue value; and
   increasing the scores proportionately to the determined distance.

3. The method of claim 1, wherein the facial recognition further comprises:
modifying pixels' scores based on a search characteristic related to the shape detection.

4. The method of claim 3, wherein the facial recognition further comprises:
normalizing the detected face to a specified scale and orientation.

5. The method of claim 4, wherein the facial recognition further comprises:
comparing the normalized face to a reference image.

6. The method of claim 5, wherein the comparing further comprises:
creating a matching map by subtracting the normalized face and the reference image from each other using the pixels' scores based on a set of rules;
deciding if the reference image and normalized face match;
if the reference image and normalized face match, performing a device operation;
if the reference image and normalized face are not a match, comparing the normalized face to a different reference image.

7. The method of claim 1, wherein the facial recognition further comprises:
determining a center of mass of a face; and
tracking facial motion based on the changing center of mass.

8. The method of claim 1, wherein the skin tone hue has a value of 25 and the range is within 30 degrees of the skin tone hue.

9. A non-transitory machine readable storage device, storing program instructions that when executed cause an executing device to perform an image processing method, the method comprising:
determining a skin tone hue value;
determining if each pixel's hue value in an image is within a range defined by a radial distance from the skin tone hue value;
for pixels that are not within the range, excluding the pixels' values form the image processing;
for pixels that are within the range, increasing a score of each such pixel; performing facial recognition based on the remaining pixel scores, detecting parts of a face using shape detection, and
recognizing specific ranges of distance from the skin tone hue value correlated with specific parts of the face.

10. The non-transitory machine readable storage device of claim 9, where the instructions comprise:
determining the radial distance for each pixel's hue value from the skin tone hue value; and
increasing the scores proportionately to the determined distance.

11. The non-transitory machine readable storage device of claim 9, where the instructions comprise:
modifying pixels' scores based on a search characteristic related to the shape detection.

12. The non-transitory machine readable storage device of claim 11, where the instructions comprise:
normalizing the detected face to a specified scale and orientation.

13. The non-transitory machine readable storage device of claim 12, where the instructions comprise:
comparing the normalized face to a reference image.

14. The non-transitory machine readable storage device of claim 13, where the instructions comprise:
creating a matching map by subtracting the normalized face and the reference image from each other using the pixels' scores based on a set of rules;
deciding if the reference image and normalized face match;
if the reference image and normalized face match, performing a device operation;
if the reference image and normalized face are not a match, comparing the normalized face to a different reference image.

15. The non-transitory machine readable storage device of claim 9, where the instructions comprise:
determining a center of mass of a face; and
tracking facial motion based on the changing center of mass.

16. The non-transitory machine readable storage device of claim 9, wherein the skin tone hue has a value of 25 and the range is within 30 degrees of the skin tone hue.

17. An image processing method, the method comprising:
determining a skin tone hue value;
determining if each pixel's hue value in an image is within a range defined by a radial distance from the skin tone hue value;
for pixels that are not within the range, excluding the pixels' values from the image processing;
for pixels that are within the range, increasing a score of each such pixel;
performing facial recognition based on the remaining pixel scores,
using shape detection to detect parts of a face, and modifying pixels scores based on a search characteristic related to the shape detection, and
recognizing specific ranges of distance from the skin tone hue value correlated with specific parts of the face.

18. An image processing method, the method comprising:
converting a color image to a hue image;
determining a skin tone hue value;
determining if each pixel's hue value in the hue image is within a range defined by a radial distance from the skin tone hue value;
for pixels that are not within the range, excluding the pixels' values from the image processing;
for pixels that are within the range, increasing a score of each such pixel;
performing facial recognition based on the remaining pixel scores, detecting parts of a face using shape detection, and
recognizing specific ranges of distance from the skin tone hue value correlated with specific parts of the face.

* * * * *